United States Patent [19]

Wang et al.

[11] Patent Number: 4,595,921
[45] Date of Patent: Jun. 17, 1986

[54] METHOD OF POLLING TO ASCERTAIN SERVICE NEEDS

[75] Inventors: An Wang, Lincoln, Mass.; Gary N. Stapleford, Londonderry; Richard W. Neiss, Hollis, both of N.H.

[73] Assignee: Wang Laboratories, Inc., Lowell, Mass.

[21] Appl. No.: 522,202

[22] Filed: Aug. 11, 1983

[51] Int. Cl.[4] .............................................. H04J 3/16
[52] U.S. Cl. ............................ 340/825.08; 340/825.5; 370/90; 370/96
[58] Field of Search ...................... 340/825.05, 825.07, 340/825.08, 825.5, 825.51; 370/29, 80, 85, 86, 90, 96

[56] References Cited

U.S. PATENT DOCUMENTS 4,149,144  4/1979  Diefendorfer ......................... 370/85
4,306,304  12/1981  Baxter et al. ........................... 370/79

FOREIGN PATENT DOCUMENTS 0012502  6/1980  European Pat. Off. ....... 340/825.08

OTHER PUBLICATIONS

Farr, R. W., et al., "Dynamically Optimized Polling System", IBM Technical Disclosure Bulletin, vol. 20, No. 2, Jul. 1977, pp. 773-774.

Primary Examiner—Donald J. Yusko
Assistant Examiner—Sharon L. Hodgkins
Attorney, Agent, or Firm—Michael H. Shanahan; Kenneth L. Milik

[57] ABSTRACT

In a communication facility a masterstation initially directs a single inquiry signal to the aggregate of the operating stations and receives a response from this aggregate indicating by its structure which of the several individual stations currently needs service from the communication facility. Messages are thereafter exchanged between the masterstation and those stations only which need service to inform the masterstation as to the details of the needed service. The many message exchanges between the master station and individual stations needing nothing is eliminated.

1 Claim, 3 Drawing Figures

METHOD OF POLLING TO ASCERTAIN SERVICE NEEDS

BACKGROUND OF THE INVENTION

This invention relates to managing communication systems, and in particular to method and apparatus enabling a master control station to ascertain which of a number of stations using a common communication channel need service from the channel.

Operating methods are known for the control of a plurality of stations using a common communication channel in which a masterstation establishes priorities and controls all use of the channel. In order to avoid interference on the channel, a protocol is usually adopted that the operating stations will transmit only when directed to do so by a message from the master station. Since the operating stations do not initiate any communications, they cannot directly call the masterstation's attention to a need for service that arises, and it is necessary for the masterstation to send inquiries from time to time to each of the operating stations. Each operating station replies when queried by indicating what if any service it needs.

SUMMARY OF THE INVENTION

A communication system managed as described above uses considerable time in the message exchange between the masterstation and the operating stations to provide the masterstation with the information about which stations need what service. It is recognized in connection with the present invention that when there are many stations sharing the channel but ordinarily only a few which are in need of any service, a large utilization of the facility is expended in obtaining very sparse information. In the present invention, the masterstation initially directs a single inquiry signal to the aggregate of the operating stations and receives a response from this aggregate indicating by its structure which of the several individual stations currently needs service from the communication facility. Messages are thereafter exchanged between the masterstation and those stations only which need service to inform the masterstation as to the details of the needed service. The many message exchanges between the masterstation and individual stations needing nothing is eliminated.

The invention comprises method and apparatus for operating a communication system which has a masterstation and a plurality of operating stations $S_i$ (where i takes various values to specify a particular operating station). The system further includes a forward communication channel on which signals are transmitted from the masterstation to all of the plurality of operating stations, a return communication channel on which signals are transmitted from any of the operating stations to the masterstation, wherein the propagation time for a signal from the masterstation to each operating station $S_i$ is $p_i$ and the propagation time from each operating station $S_i$ to the masterstation is $p_i'$. The invention features the following steps and the means therefor: assign to each operating station $S_i$ an assigned delay value $d_i$ specific to the station such that each operating station's returned delay value $D_i = p_i + p_i' + d_i$ is distinct for each station $S_i$, store at each operating station $S_i$ its assigned delay value $d_i$, transmit from the masterstation on the forward communication channel a distinctive polling sync signal, emit on the return channel from each operating station $S_i$ which needs service a polling reply signal indicative of needing to use a communication channel, the reply signal being emitted after the assigned delay interval $d_i$ specific to the station after receiving the polling sync signal, receive at the masterstation the signals indicative of needing service, and associate the arrival times of such received signals with operating station addresses to ascertain which operating stations need service, and initiate from the masterstation an addressed message exchange with each operating station ascertained to need service to ascertain what service is needed.

DETAILED DESCRIPTION OF THE INVENTION

Figure 1:
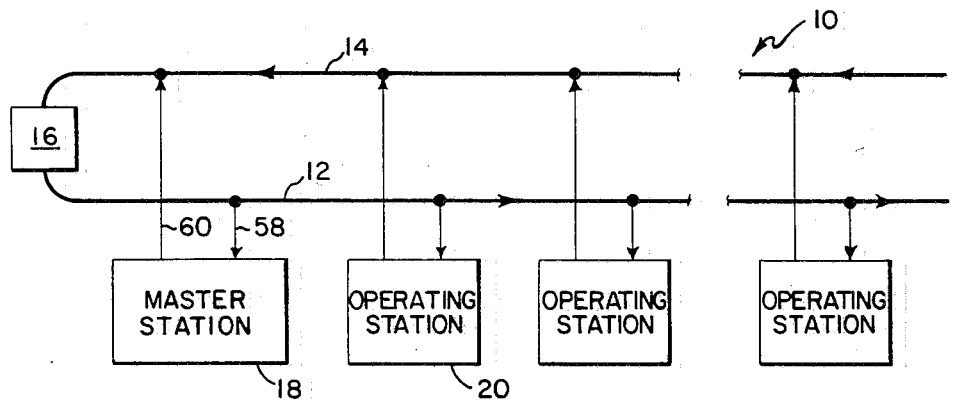
FIG. 1 shows schematically a communications system according to the invention.

As shown particularly in FIG. 1, communication system 10 includes masterstation 18, a plurality of operating stations of which 20 is exemplary, and inbound coaxial cable 14 conveying signals from the masterstation and all operating stations to head 16, and outbound coaxial cable 12 conveying signals from head 16 to the masterstation and every operating station. A forward communication channel for tranmission of system supervisory signals from the masterstation to the operating stations is provided by a defined frequency band with transmissions from the masterstation propagating on the inbound cable to the head and thence on the outbound cable to every operating station. A return communication channel for transmission of system supervisory signals from every operating station to the masterstation is provided by a defined frequency band with transmissions from the operating stations propagating on the inbound cable to the head and thence on the outbound cable to the masterstation. Amplifiers, splitters, and other devices may be used as appropriate to control signal level and impedance of the channels as required by circumstances according to well known principles; such design details are unrelated to the subject invention.

Figure 2:
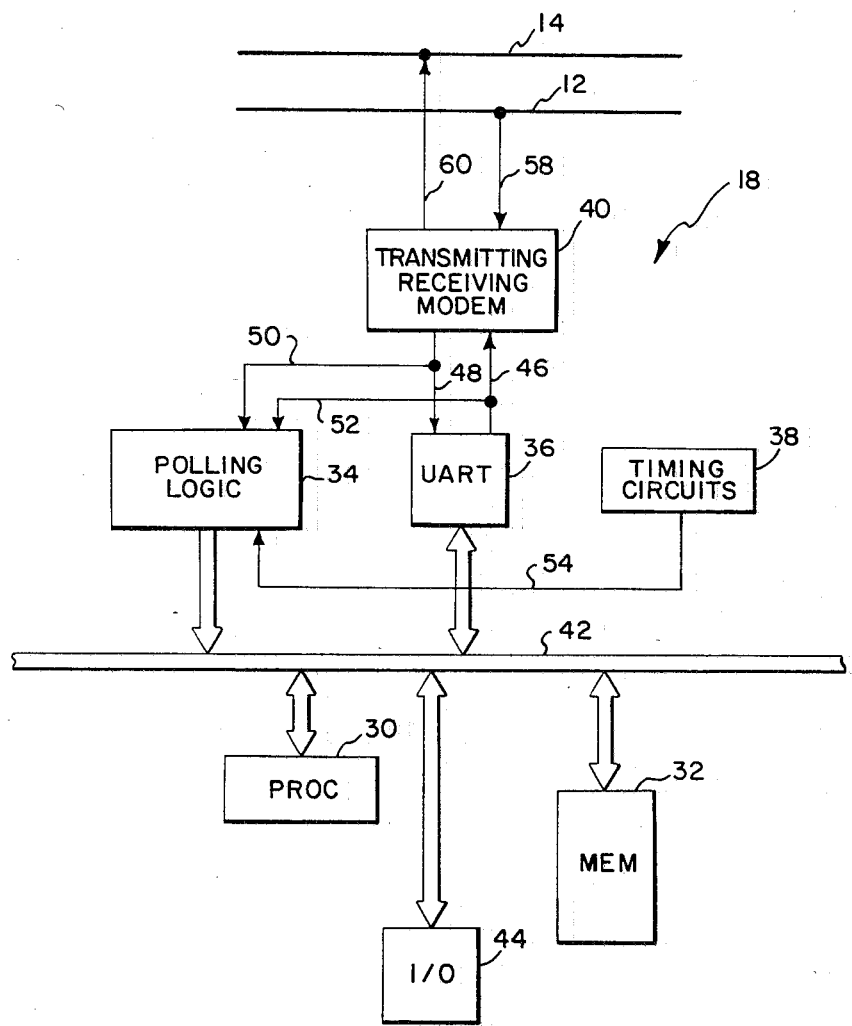
FIG. 2 shows in greater detail the masterstation of FIG. 1.

As shown particularly in FIG. 2, masterstation 18 includes processor 30, memory 32, timing generating circuits 38, uart 36 (meaning universal assynchronous receiver-transmitter), polling logic 34, and transmitting-receiving modem 40. Bus 42 interconnects the processor, memory, uart and polling logic for transfer of parallel data. Modulated carrier signal is transferred from cable 12 to modem 40 on link 58 and from modem 40 to cable 14 on link 60. Serial bit data is transferred as shown on links 46, 48, 50, and 52. Timing signals are transferred from timing generating circuits 38 to polling logic 34 on link 54. Other timing and control connections not shown are used to enable the processor to control the operations of the stations in accordance with well known design principles. Station 18 may communicate with other computers or peripherals through I/O devices 44.

Figure 3:
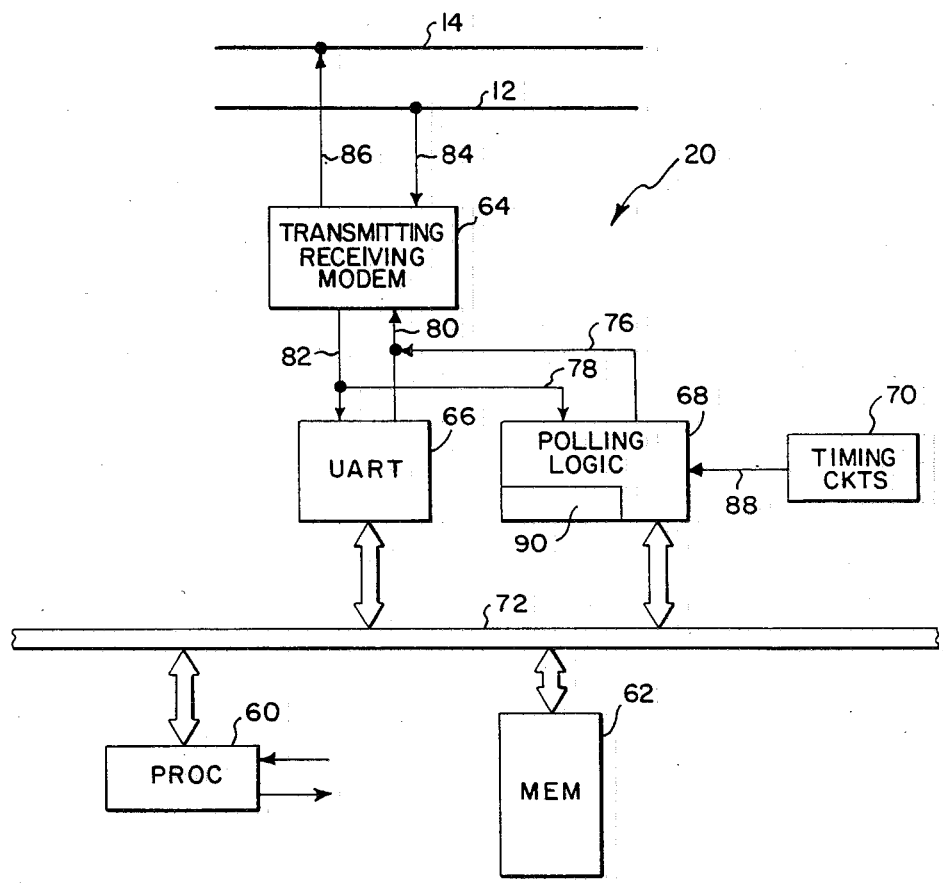
FIG. 3 shows in greater detail an operating station of FIG. 1.

An operating station, shown more particularly in FIG. 3, includes processor 60, memory 62, uart 66 polling logic 68, delay switch bank 90, timing circuits 70, and transmitting-receiving modem 64. Connector 86 carrying carrier modulated signals connects cable 12 to modem 64; connector 86 connects modem 64 to cable 14. Connectors 76 and 78 interconnect polling logic 68 and modem 64; connectors 80 and 82 interconnect uart 66 and modem 64 (all carrying serial bit data). Connector 88 connects timing circuits 70 to polling logic 68. Bus 72 carrying parallel byte data interconnects processor 60, memory 62, uart 66, switchbank 90, and polling logic 68.

In the particular embodiment described here, the forward and return channels are used exclusively for communications between the masterstation and each of the operating stations to effect supervision and control of a communication network serving the several operating stations. Other communication channels are used to carry intercommunication among the operating stations. Messages are sent over the channels by modulated carrier in the form of packets, each with a start bit, 8 information bits, a parity bit (odd parity), and a stop bit. Each operating station has a unique address and is programmed to respond to messages starting with its own address and to those with a broadcast address. In order to avoid interferring transmissions on the commonly used communication channels, the operating stations are programmed to transmit only when directed to do so by the masterstation, which thus completely controls the use of the channels. In the exemplary embodiment, there are 2047 operating stations with addresses running from 1 to 2047. The broadcast address is 0.

The operation of the system is as follows. Before initiating regular communications on the system, each operating station $S_i$ (where i takes different values to designate particular stations) is assigned a delay value $d_i$. The values of $d_i$ are chosen with reference to the propagation delays $p_i$ required to propagate a signal from the masterstation to the stations $S_i$, and the propagation delays $p_i'$ required to propagate a signal from the operating stations $S_i$ to the masterstation. In general the values $d_i$ are chosen so that each operating station $S_i$ will have a distinct value for its return delay value $D_i = p_i + p_i' + d_i$. For each station $S_i$, the value of $d_i$ assigned is then stored by entering the value in delay switchbank 90. In the exemplary embodiment, the propagation delays are negligible, and the assigned delay values are made equal to 128 usec times the station address.

In routine operation, the processor 30 of the masterstation initiates a poll by transmitting a distinctive five-byte message which is transmitted through the uart 36 and the modem 40 to channel 14. The first two bytes are the broadcast address, (i.e., 00000000, 00000000, in binary); the third byte is without information content, being reserved for system expansion; the fourth byte is 00000000, a command code indicating the message is a polling request, and the fifth byte is used to generate the polling sync signal. This fifth byte is 1000 0000 in binary. When encoded for transmission by uart 36 in an 11-bit packet this will produce an output sequence of a low (the start bit), a high, eight lows (the last being the parity bit), and a high (the terminator bit). The transition from the parity bit to the terminator bit is used as the timing signal for synchronizing the polling. During the long sequence of 0's in the fifth byte the polling logic 34 is armed by an output from the processor, and the rising edge of the terminator bit triggers the start of counting circuits in the polling logic which start counting timing pulses delivered from timing generator 38 on connector 54.

The polling request message is processed by modem 40 and propagated over the communication channels to each of the operating stations. In general, the operating stations may receive the polling request message at different times because of propagation delays. At exemplary station 20, the message is received and demodulated by modem 64 and passed in serial bit form to uart 66, which puts the information bits on the bus 72 in parallel form. The processor 60 decodes the message and identifies it from the first four bytes of the message as a polling request. Then if the station needs service, the processor during the sequence of 0's in the fifth byte arms the polling logic 68. When thus armed, polling logic 68 is triggered by the rising edge of the last bit of the fifth byte and begins to count timing pulses supplied on connector 88 from timing circuits 70. The rising count of these timing pulses is compared with the stored delay value $d_i$ in switchbank 90, and when the two are equal, the polling logic emits on connector 76 a 32us. reply pulse, indicating that the operating station needs service. This pulse is processed through modem 64 which transmits the pulse in modulated carrier form on connector 86 onto channel 14. If at the time the polling sync signal is received by a station, the station does not need service the polling logic is not armed and no transmission is made. An absence of transmission at the time $d_i$ thus constitutes a reply that no service is needed.

The reply pulses from all the responding operating stations will be propagated along the return communication channel to the masterstation where, because of the manner of selecting the several $d_i$ with regard to the propagation delays, they will arrive without overlapping or interference. At the masterstation 18 the transmissions are received and demodulated by modem 40 which sends to polling logic 34 over connector 50 a signal with a high voltage appearing at times $D_i$ corresponding to the return delays of the operating stations that transmitted a help-needed signal and with low voltage appearing at the times $D_i$ corresponding to the return delays of stations making no reply transmission. The polling logic 34 interprets these high or low voltages as logical 1's or 0's and enters them in successive positions of a serial in-parallel out, eight bit register, using the timing pulses received from timing circuits 38 to trigger the gating into successive bit positions. When the parallelizing register is filled, corresponding to the receipt of the replies of eight operating stations, the register contents is transferred as bytes in parallel form onto bus 42 and lodged in a designated address in memory 32, and the polling logic proceeds to process the following reply pulses in the same manner until it has processed the replies from all the operating stations, with successive bytes transferred from the logic places in successive addresses in memory. When all the reply signals have been processed as indicated there will be created a service need map in the designated portion of the masterstation memory 32 which has a bit corresponding to each operating station with the value of the bit indicating whether the corresponding station needs service. In the usual situations contemplated for use of this invention the memory map will be preponderantly 0's (indicating no need for service) with a sprinkling of 1's.

When the service need map is completed, the masterstation processor scans the map systematically and where it finds a 1 at a particular position it associates the position with an operating station address. This association may be done through a look up table or simply through an algorithm generating the station address from the map position. The masterstation processor then, using the address, sends one or more addressed messages to the corresponding operating station to ascertain what service is required and provide that service. After proceeding systematically through the service need map and providing whatever service is needed by all the stations indicating that they need service, the processor initiates another polling cycle to obtain an updated map of service needs of the operating stations.

The method and apparatus described are readily implemented in detail with standard circuitry and programming well known to those skilled in the communications and computer art and need not be further expanded upon.

We claim:

1. A method for operating and expanding a communications system, said system having, prior to expansion, a masterstation and a plurality of prior operating stations $S_i$ (where i takes various values to specify a particular operating station), a forward communication channel on which signals are communicated from said masterstation to all of said prior operating stations, a return communication channel on which signals are communicated from any of said prior operating stations to said masterstation, the time for propagating a signal from the masterstation to each prior operating station being $p_i$ and the time for propagating a signal from each prior operating station to the masterstation being $p_i'$, including the steps prior to expanding,
assign to and store at each prior operating station $S_i$ an assigned delay value $d_i$ specific to each operating station such that each prior operating station's returned delay value $D_i = p_i + p_i' + d_i$ is distinct for each prior operating station $S_i$,
transmit from said masterstation on said forward communication channel a distinctive polling sync signal,
transmit on the return channel from each prior operating station which needs service a polling reply signal indicative of needing to use a communication channel, said reply signal being emitted after the assigned delay interval $d_i$ specific to the station after receiving said polling sync signal,
receive at said masterstation the signals indicative of needing service and associate the arrival times of such signals with operating station addresses to ascertain which operating stations need service,
initiate from the masterstation an addressed massage exchange with each prior operating station ascertained to need service to ascertain what service is needed, and at the time of expansion
connect a new operating station to any point along said forward and return communication channels,
while leaving unchanged delay times $d_i$ assigned to and stored at all prior operating stations, assign to and store at said new station an assigned delay value $d_n$ such that the new station's returned delay value $D_{n=pn} + p'_n + d_n$ is distinct from the returned delay value $D_i$ of any of the prior stations, and after expansion
transmit from said master station on said forward communication channel a distinctive polling sync signal,
transmit on the return channel from each prior operating station which needs service and from said new operating station if it needs service a polling reply signal indicative of needing to use a communication channel, said reply signal being emitted after the assigned delay interval $d_i$ or $d_n$ specific to the operating station after receiving said polling sync signal,
receive at said masterstation the signals indicative of needing service and associate the arrival times of such signals with operating stations to ascertain which operating stations need service,
initiate from the masterstation an addressed message exchange with each prior operating station ascertained to need service to ascertain what service is needed.

* * * * *